(12) United States Patent
Gonzalez et al.

(10) Patent No.: US 10,151,407 B2
(45) Date of Patent: Dec. 11, 2018

(54) BRAIDED HOSE

(71) Applicant: Coflex S.A. de C.V., Monterrey, Nuevo Leon (MX)

(72) Inventors: Pedro Gonzalez, Nuevo Leon (MX); Eduardo Coronado, Nuevo Leon (MX)

(73) Assignee: Coflex S.A. de C.V., Monterrey (MX)

( * ) Notice: Subject to any disclaimer, the term of this patent is extended or adjusted under 35 U.S.C. 154(b) by 0 days.

(21) Appl. No.: 15/675,579

(22) Filed: Aug. 11, 2017

(65) Prior Publication Data

US 2018/0045342 A1 Feb. 15, 2018

Related U.S. Application Data

(60) Provisional application No. 62/373,672, filed on Aug. 11, 2016.

(51) Int. Cl.
| | |
|---|---|
| *F16L 11/00* | (2006.01) |
| *F16L 11/08* | (2006.01) |
| *E03C 1/02* | (2006.01) |
| *F16L 33/207* | (2006.01) |
| *F16L 11/10* | (2006.01) |
| *B65H 81/00* | (2006.01) |

(52) U.S. Cl.
CPC ............ *F16L 11/085* (2013.01); *B65H 81/00* (2013.01); *E03C 1/025* (2013.01); *F16L 11/10* (2013.01); *F16L 33/2071* (2013.01); *E03C 1/021* (2013.01)

(58) Field of Classification Search
CPC ........ F16L 11/10; F16L 11/085; F16L 11/086; F16L 11/125
USPC ........................................ 138/137, 127, 109
See application file for complete search history.

(56) References Cited

U.S. PATENT DOCUMENTS

| | | | | |
|---|---|---|---|---|
| 4,275,937 | A * | 6/1981 | Belofsky | F16L 11/086 138/127 |
| 4,420,018 | A * | 12/1983 | Brown, Jr. | F16L 11/10 138/124 |
| 44,200,018 | | 12/1983 | Brown, Jr. | |
| 4,662,405 | A * | 5/1987 | Besche | F16L 11/086 138/124 |
| 4,802,510 | A | 2/1989 | Berlincourt et al. | |
| 5,562,126 | A * | 10/1996 | Briand | F16L 11/10 138/123 |
| 6,978,805 | B2 * | 12/2005 | D'Amico | F16L 11/085 138/125 |
| 8,356,637 | B2 * | 1/2013 | Gregrich | F16L 11/086 138/125 |
| 8,858,530 | B2 * | 10/2014 | Nishigishi | A61M 25/0053 138/123 |

(Continued)

FOREIGN PATENT DOCUMENTS

| | | |
|---|---|---|
| EP | 0069957 A2 | 1/1983 |
| EP | 2426389 A1 | 3/2012 |

OTHER PUBLICATIONS

International Search Report and Written Opinion for PCT/MX2017/000094 dated Nov. 6, 2017, 15 pages.

*Primary Examiner* — Patrick F Brinson
(74) *Attorney, Agent, or Firm* — Baker & McKenzie LLP (57) ABSTRACT

A reinforced hose includes a tube and a braided sleeve disposed about an outside of the tube. The braided sleeve includes a plurality of bundles. A bundle may be defined as a plurality of threads extending along a same path of a braiding pattern of the braided sleeve. At least one of the bundles includes a metallic thread and a non-metallic thread.

22 Claims, 6 Drawing Sheets

(56) References Cited

U.S. PATENT DOCUMENTS

2010/0126617 A1* 5/2010 Stroempl .............. F16L 11/125
                                                  138/137
2014/0251484 A1   9/2014 Kury

* cited by examiner

BRAIDED HOSE

CROSS-REFERENCE TO RELATED APPLICATIONS

This patent application claims priority to provisional patent application 62/373,672, filed Aug. 11, 2016, which is incorporated by reference herein in its entirety.

BACKGROUND

Plumbing supply lines are used to connect a water supply to plumbing fixtures such as faucets, toilets, dishwashers, washing machines, steam dryers, ice makers, water filters, showers, and bathtubs, among others. Plumbing supply lines can be made from an interior tube braided with stainless steel, copper, plastic, or a similar material. Each end of the plumbing supply line includes a connector operable to connect the water supply to the plumbing fixtures. Each connector is operable to rotate freely relative to the plumbing supply line so that the plumbing supply line can be connected to the water supply and the plumbing fixture.

However, if the braiding on the plumbing supply line is compromised, the burst pressure of the supply line may be reduced and the supply line may fail, which may cause damage to surrounding property and also waste water. In the case of braiding made of metallic thread, the metal may corrode due to exposure to chemicals and corrosive agents. In the case of non-metallic threads, the threads may be abraded or cut.

Therefore, an improved apparatus that is resistant to both corrosion and abrasion is desired.

BRIEF SUMMARY

In an example, a reinforced hose includes a tube and a braided sleeve disposed about an outside of the tube. The braided sleeve includes a plurality of bundles. A bundle may be defined as a plurality of threads extending along a same path of a braiding pattern of the braided sleeve. At least one of the bundles includes a metallic thread and a non-metallic thread.

In some embodiments, the metallic thread includes stainless steel.

In some embodiments, the non-metallic thread includes a polymer.

In some embodiments, the non-metallic thread includes a monofilament selected from a polyester monofilament, a nylon monofilament, and any combination thereof.

In some embodiments, a reinforced hose further comprises a fitting coupled to an end of the tube and the braided sleeve.

In some embodiments, at least one of the bundles includes a plurality of metallic threads and a plurality of non-metallic threads, and the metal threads are arranged to alternate with the non-metallic threads.

In some embodiments, the braided sleeve includes twenty four bundles, and each bundle includes three metallic threads and three non-metallic threads.

In some embodiments, the metallic threads and the non-metallic threads are arranged according to a braiding pattern.

In some embodiments, the braiding pattern includes bundles with an equal number of metallic threads and non-metallic threads per bundle.

In some embodiments, the braiding pattern includes bundles with a number of metallic threads that differs from a number of non-metallic threads per bundle.

In some embodiments, the metallic threads and the non-metallic threads are a similar color.

In another example, a reinforced hose includes a tube and a braided sleeve disposed about an outside of the tube. The braided sleeve includes a plurality of bundles. A bundle may be defined as a plurality of threads extending along a same path of a braiding pattern of the braided sleeve. At least one of the bundles is a mixed bundle. A mixed bundle may be defined as a bundle of threads including at least one metallic thread and at least one non-metallic thread. A burst pressure of the reinforced hose is higher than a burst pressure of a hose without the at least one mixed bundle.

In some embodiments, the burst pressure of the reinforced hose is at least about 10% higher than the burst pressure of a hose without at least one mixed bundle.

In some embodiments, the braided sleeve includes mixed bundles of three metallic threads and three non-metallic threads.

In some embodiments, the three metallic threads are grouped together to one side of the three non-metallic threads, which are grouped together.

In some embodiments, the burst pressure has a value of at least 1150 psi.

In some embodiments, the metallic threads are degraded, and the burst pressure has a value of at least 750 psi.

In some embodiments, the non-metallic threads are degraded, and the burst pressure has a value of at least 750 psi.

In another example, an apparatus for manufacturing a braided hose includes a platform, a guide, a plurality of bobbins and a motor. The guide is disposed over an aperture in the platform and operable to direct a tube. The plurality of bobbins is disposed on the platform. The bobbins are respectively operable to hold bundles of thread. The bobbins are respectively operable to rotate about an axis. The motor is coupled to the platform and operable to rotate the platform. At least one of the bobbins includes a metallic thread. At least one of the bobbins includes a non-metallic thread.

In some embodiments, each of the bobbins includes both metallic and non-metallic threads.

In the various figures, similar elements shown in different figures may have different reference numbers. The figures and associated description provide a plurality of different embodiments and similar elements among the figures will illustrate to one of ordinary skill in the art the possible functionality and connection of those elements in the multiple and collective embodiments disclosed herein.

DETAILED DESCRIPTION

Reference is now made to the following detailed description, taken in conjunction with the accompanying drawings. It is emphasized that various features may not be drawn to scale and the dimensions of various features may be arbitrarily increased or reduced for clarity of discussion. Further, some components may be omitted in certain figures for clarity of discussion.

Various aspects of a braided hose and related methods according to the present disclosure are described. It is to be understood, however, that the following explanation is merely exemplary in describing the devices and methods of the present disclosure. Accordingly, any number of reasonable and foreseeable modifications, changes, and/or substitutions is contemplated without departing from the spirit and scope of the present disclosure.

Embodiments disclosed herein are directed to a reinforced hose for conducting fluids and gases and, more particularly, to a reinforced hose including both metallic and non-metallic threads. The present disclosure relates, according to some embodiments, to a reinforced hose, the reinforced hose comprising an interior tube and a braided sleeve, the braided sleeve including a plurality of bundles, where a bundle is defined as a plurality of threads extending along a same path of a braiding pattern of the braided sleeve, and where at least one of the bundles includes both a metallic and a non-metallic thread.

The present disclosure further relates, according to some embodiments, to a reinforced hose comprising an interior tube and a braided sleeve, where the braided sleeve comprises at least one mixed bundle, a mixed bundle being defined as a bundle of threads including at least one metallic thread and at least one non-metallic thread, wherein a burst pressure of the reinforced hose is higher than a burst pressure of a hose without mixed bundles.

Further, the present disclosure relates to a system for manufacturing a braided hose, the system comprising a platform, a guide, a series of bobbins, and a motor, the system operable to create a braided sleeve around an interior tube.

Figure 1:
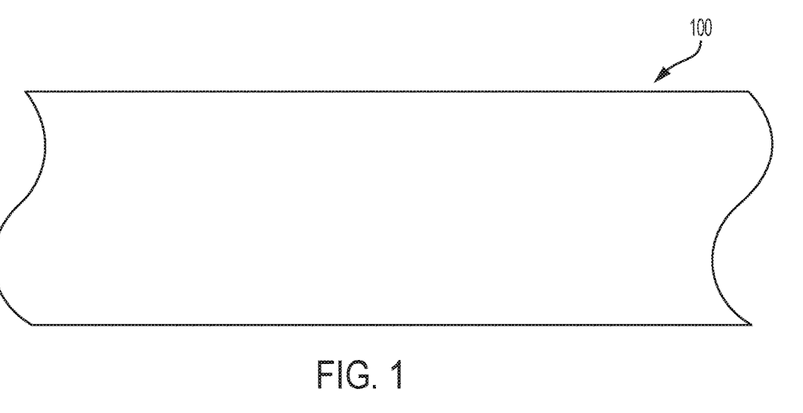
FIG. 1 illustrates an interior tube of a supply line, according to an embodiment of the disclosure.

FIG. 1 illustrates an interior tube 100 of a supply line. In some embodiments, interior tube 100 may be liquid impervious and flexible, and may be comprised of a natural polymer, a synthetic polymer, a copolymer, a terpolymer, and/or the like. In some embodiments, selection of interior tube 100 may be based on the type of fluid or gas being conducted. For example, interior tube 100 may comprise ethylene-propylene-compound diene (EPDM), or another plastic or rubber material, such as cross-linked polyethylene (PEX), thermoplastic elastomer and silicone may be used when potable water is conducted. According to some preferred embodiments, a burst pressure of interior tube 100 may be less than about 160 psi, or less than about 100 psi, where "about" represents plus or minus 5 psi. In some preferred embodiments, a burst pressure of interior tube 100 may be less than about 10 bar, or less than about 7 bar, where "about" represents plus or minus 0.5 bar.

A low burst pressure of interior tube 100 may be problematic for many applications. For example, it may be problematic for a residential water supply. While the normal water pressure of a residential home may be typically adjusted to be in a 25-75 psi (1.7-5.2 bar) range, misadjustment of a pressure regulator or temporary fluctuations in the water supply may cause water pressures to go above 100 psi (6.9 bar).

Figure 2:
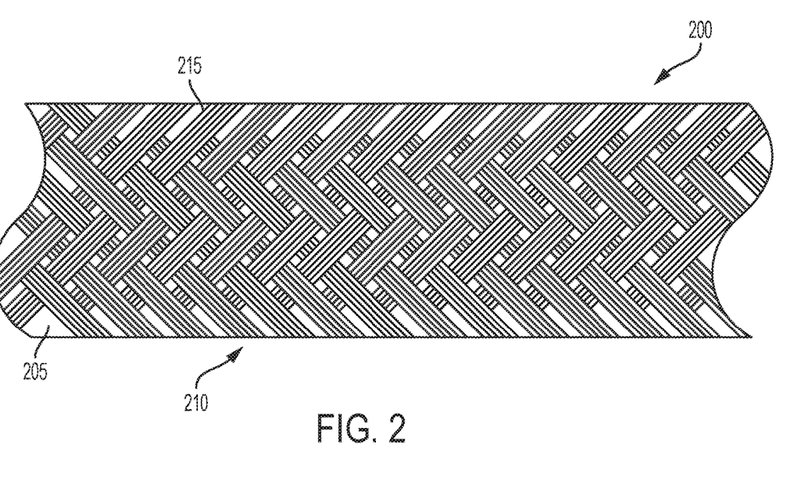
FIG. 2 illustrates a hose assembly with a braided sleeve, according to an embodiment of the disclosure.

FIG. 2 illustrates a hose assembly 200. In order to provide a greater burst pressure, interior tube 205 may be provided with an outer braided sleeve 210 as shown in FIG. 2. A braided sleeve 210 may be disposed about an outside of interior tube 205. In some embodiments, braided sleeve 210 may significantly increase the burst pressure of hose assembly 200. According to some embodiments, a braided sleeve 210 may comprise a thread 215, where thread 215 may be metallic or non-metallic. In some embodiments, braiding using metallic threads may provide a burst pressure in the range of about 2000 psi (about 138 bar). In some embodiments, braiding using non-metallic threads may provide a burst pressure in the range of about 1000 psi (about 69 bar).

In some embodiments, non-metallic threads may be formed of an extruded polyester fiber, which may be coated with additional material, for example PVC and/or the like, to impart strength, and aesthetic characteristics. In some embodiments, non metallic threads may also be formed of monofilament materials such as polyester, nylon, and/or the like. For example, an interior tube may be braided with a polymer material, which, in one embodiment, may comprise interweaved monofilament. Such monofilament may be arranged in a thread arrangement. For example, in one embodiment, monofilament may be arranged in a 6×6 thread arrangement when applied as a braiding to the interior tube. This arrangement improves resistance to corrosion.

Both metallic threads and non-metallic threads are subject to types of degradation. If the metallic threads or the non-metallic threads are compromised, there may be a reduction in burst pressure. Metallic threads may be compromised, for example, by corrosion due to exposure to chemicals, corrosive agents, and/or the like. Non-metallic threads may be compromised due to abrasion, which may occur, for example, from impact with tools such as knives, screw drivers, wrenches, and/or the like. Abrasions may occur during an installation process, a repair process, and/or the like. Non-metallic threads may also be subject to degradation from environmental factors, for example UV rays.

The use of non-metallic threads has the additional disadvantage of being perceived by the consumer as of a lower quality in that a polymer braided hose may be viewed as "plastic" and inferior to a metal, e.g., stainless steel, braided hose even though a polymer braiding may provide a substantial increase in burst pressure and offer resistance to degradation due to corrosive agents, chemicals, and/or the like.

One approach according to the present disclosure to address the individual deficiencies of metallic and non-metallic threads is to combine them such that one bundle of threads is metallic and another bundle of threads is non-metallic.

In some embodiments, a hose assembly including an interior tube and a braided sleeve may be referred to as a reinforced hose.

Figure 3:
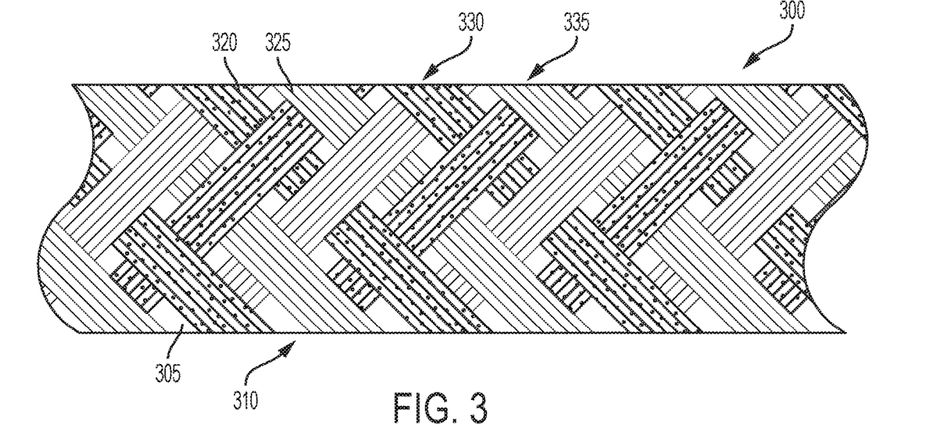
FIG. 3 illustrates a hose assembly with a braided sleeve, according an embodiment of the disclosure.

FIG. 3 illustrates a hose assembly 300, including an interior tube 305 and a braided sleeve 310. The hose assembly 300 further includes a metallic thread 320, depicted with a patterned shading, and a non-metallic thread 325, shown without the patterned shading. In some embodiments, a grouping of two or more metallic threads 320 forms a metallic thread bundle 330, depicted with patterned shading. In some embodiments, a grouping of two or more non-metallic threads 325 form a non-metallic thread bundle 335, depicted without the patterned shading.

In some embodiments, a bundle refers to the grouping of threads that comes from a bobbin in a braiding machine, which is discussed in further detail below. In some embodiments, a bundle may be a group of threads that follows a path of a braiding pattern of the braided sleeve. FIG. 3 illustrates an example of a 6×6 thread braiding pattern, where six metallic threads 320 form a metallic thread bundle 330 and six non-metallic threads 325 form a non-metallic thread bundle 335, where the metallic thread bundles 325 and the non-metallic thread bundles 335 are interwoven.

Braiding around the interior hose with bundles respectively of metallic and non-metallic threads may provide a burst pressure of the order of 1000 psi (about 69 bar). Mixing metallic and non-metallic threads may also offer some improvement in resistance to degradation. If the braided hose is exposed to a chemical and/or the like, then the metallic threads may lose their integrity but the non-metallic threads may resist degradation. Similarly, if the braided hose is abraded by a tool, a knife, and/or the like, then the non-metallic threads may lose their integrity but the metallic threads may resist abrasion.

Figure 4:
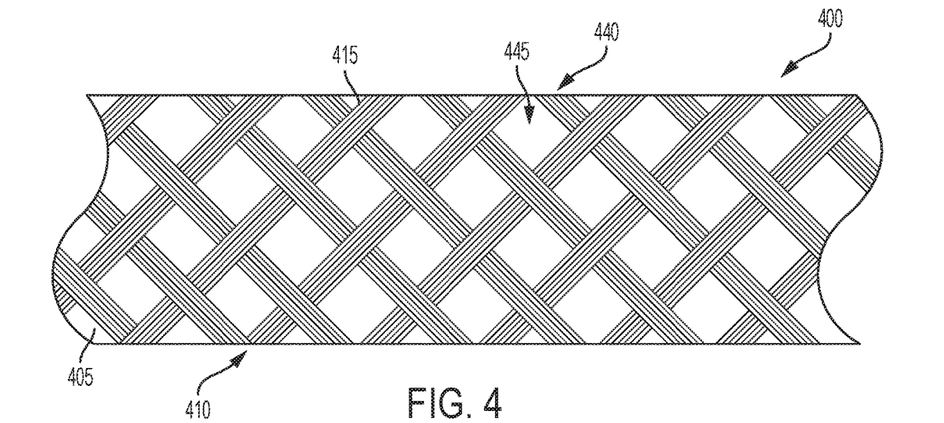
FIG. 4 illustrates a braiding pattern, according to an embodiment of the disclosure.

FIG. 4 illustrates a braiding pattern 400 resulting from degradation of either the metallic thread bundle or the non-metallic thread bundle in the braiding pattern of FIG. 3. FIG. 4 shows an interior tube 405, braided sleeve 410, a thread 415, a bundle 440, and an opening 445. In some embodiments, bundle 440 may consist of metallic threads or non-metallic threads. The degradation of one type of bundle in a braiding pattern (e.g., a braiding pattern as shown in FIG. 3) may result in the remaining bundle forming openings 445.

According to some embodiments, a burst pressure may be reduced to less than half of the original burst pressure (e.g., less than about 500 psi (about 34.5 bar)) by degradation of one of the thread bundles in the braiding pattern of FIG. 3, but it is still improved compared to the burst pressure of the hose alone.

Further, bundling the threads as metallic thread bundles and non-metallic thread bundles also has the disadvantage that the non-metallic thread bundles are readily identified by a consumer as they contrast with the metallic thread bundles. For example, the metallic thread bundles may be shinier than the non-metallic thread bundles. This difference in reflection may attract the attention of a consumer. As a result, a consumer may view the braided hose as inferior for its inclusion of what may be perceived as lower quality (e.g., "plastic") materials.

Figure 5:
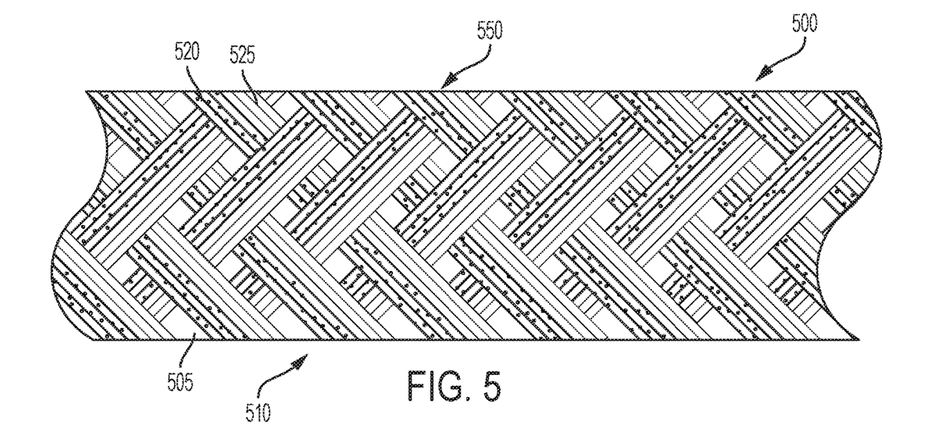
FIG. 5 illustrates a braiding pattern, according to an embodiment of the disclosure.

FIG. 5 illustrates a braiding pattern 500. FIG. 5 shows an interior tube 505, a braided sleeve 510, a metallic thread 520, depicted with patterned shading, a non-metallic thread 525, depicted without shading arranged in a mixed bundle 550. In some embodiments, mixed bundle 550 may include both metallic threads 520 and non-metallic threads 525. In some embodiments, a mixed bundle 550 may include three metallic threads 520 and three non-metallic threads 525. In this example, each mixed bundle 550 includes six threads—three metallic threads 520 and three non-metallic threads 525. Metallic threads 520 are illustrated grouped together to the left side of each mixed bundle 550 and the non-metallic threads 525 are illustrated grouped together on the right side of each mixed bundle 550, but the braiding pattern is not limited thereto.

In some embodiments, a mixed bundle 550 may make it harder for a consumer to detect non-metallic threads 525 within braided sleeve 510, thereby reducing the risk of a consumer viewing a braided hose as inferior based on its inclusion of what may be perceived as lower quality (e.g., "plastic") materials.

Figure 6:
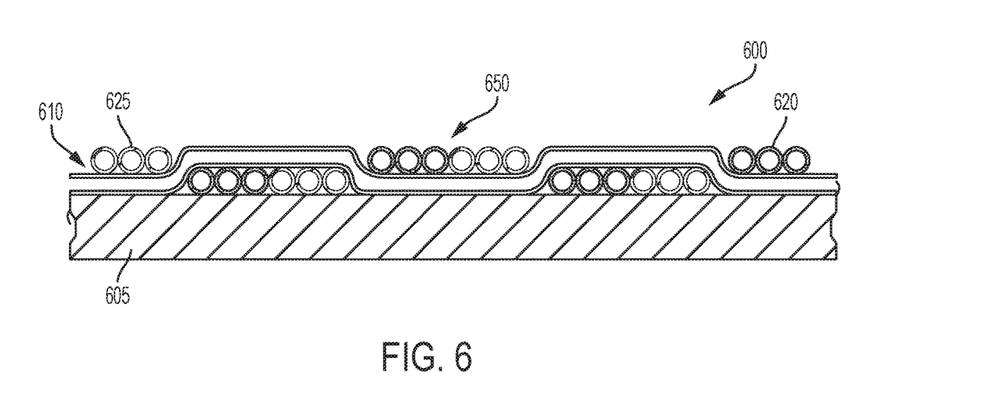
FIG. 6 is a cross sectional view of a hose assembly, according to an embodiment of the disclosure.

FIG. 6 illustrates a cross section 600 of an interior tube 605 and a braided sleeve 610, taken along the length of the interior tube 605, illustrating metallic threads 620, depicted with shading, and non-metallic threads 625, depicted without shading, grouped in mixed bundles 650 of the braiding pattern of the braided sleeve 610.

In some embodiments, the non-metallic threads 625 may include a monofilament such as a polyester monofilament and/or the like. Non-metallic threads 625 may include a coated fiber such as a core thread (e.g., polyester, cotton, etc.), coated with a plastic-like material such as a thermoplastic. In some embodiments, a plastic substance and core material may be employed to form a non-metallic thread 625. In some embodiments, a plastic substance may include a vinyl substance, a polyvinyl substance, and/or the like. In some embodiments, a core material may include a plastic material, a polymeric material, and/or the like. In some embodiments, a plastic substance may include polyvinyl chloride and a core material may include polyester filaments.

In some embodiments, a braiding pattern may be arranged as a 6×6 interweaved bundle arrangement of three polymer threads and three threads of stainless steel per bundle. According to some embodiments, a combined arrangement of stainless steel and polymer threads as described above may have increased benefits of improving resistance to corrosion, while also providing increased resistance to sharp objects or any other degradation of polymer threads.

In some embodiments, a braiding pattern may be arranged as a 6×6 interweaved bundle arrangement of four polymer threads and two threads of stainless steel per bundle.

In some embodiments, a braiding pattern may be arranged as a 6×6 interweaved bundle arrangement of 3 polymer threads and 3 threads of stainless steel per bundle that are mixed in any way. That is, the polymer threads do not need to be respectively arranged in a group of three on a left or right side. For example, a bundle arrangement of three polymer threads and three threads of stainless steel may be grouped as follows: polymer, polymer, stainless, polymer, stainless, stainless. A bundle arrangement of two polymer threads and two threads of stainless steel may be grouped as follows: polymer, stainless, stainless, polymer. In some embodiments, metallic threads and non-metallic threads of a bundle may be arranged in any order.

In some embodiments, a material of a non-metallic thread may have a similar color to a color of a metallic thread.

Including both metallic and non-metallic threads in each bundle offers several advantages. First, the reflectivity of the bundles is all the same. Thus, it becomes much more difficult to observe that non-metallic materials are included and the perceived quality to the consumer may be improved. This is further exemplified when the non-metallic material is a similar color to the metallic material. For example, if the metallic thread includes stainless steel, then the non-metallic threads may be a medium grey color.

In another embodiment, a lower grade material such as aluminum or another metal may be used in place of the non-metallic material. For example, each bundle may include aluminum threads and stainless steel threads. The presence of each material in each bundle may make the reflectivity of the bundles similar such that it becomes more difficult to observe the lower grade material. Aluminum is less expensive that stainless steel. The mixed bundles of aluminum and stainless steel may provide a less expensive product while still providing a perception of quality to the consumer. It will be appreciated that other combinations are also contemplated, such bundles respectively including aluminum threads and non-metallic threads.

Figure 7:
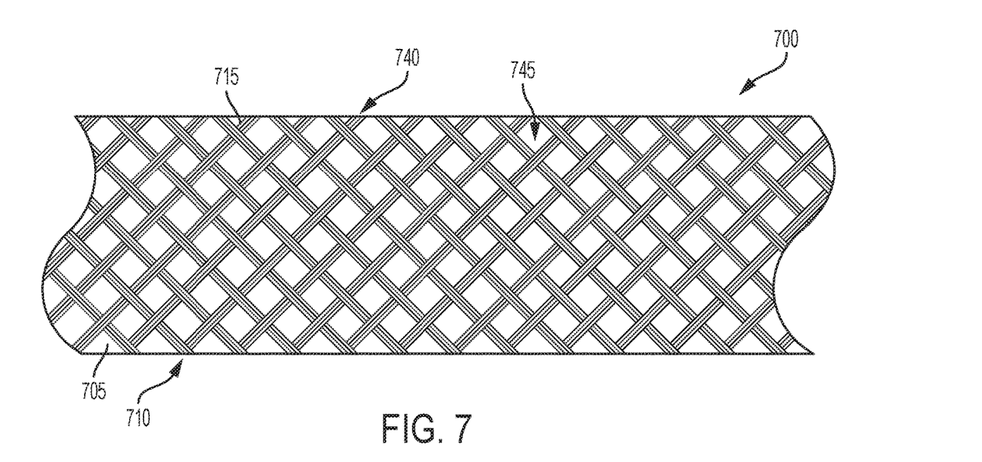
FIG. 7 illustrates a braiding pattern, according to an embodiment of the disclosure.

Another exemplary advantage is that the openings between the threads of the same material are respectively smaller, as illustrated in FIG. 7.

FIG. 7 illustrates a braiding pattern 700 resulting from degradation of either the metallic threads or the non-metallic threads in a mixed bundle in the braiding pattern of FIG. 5. FIG. 7 shows an interior tube 705, a braided sleeve 710, a thread 715, a bundle 740, and an opening 745. In some embodiments, bundle 740 may include metallic threads or non-metallic threads. The degradation of one type of threads of a bundle in a braiding pattern (e.g., a braiding pattern as shown in FIG. 5) may result in the remaining threads of a bundle forming openings 745.

In some embodiments, openings 745 in braiding pattern 700 of FIG. 7 may be significantly smaller than, for example, openings 445 of FIG. 4. As a result, the burst pressure is comparatively higher. In the example of FIG. 7, the burst pressure may be of the order of about 750 psi (about 51.7 bar), which is approximately a 50% improvement compared to that of FIG. 4.

In some embodiments, a reduction in size of openings 745 may improve the burst pressure even without any degradation. Where the braiding pattern of FIG. 3 may have a burst pressure of about 1000 psi (about 68.9 bar), braiding pattern 500 of FIG. 5 may have a burst pressure of about 1150 psi (about 79.3 bar). Thus, braiding pattern 500 of FIG. 5 may offer an improvement of more than about 10% to burst pressure of the braided hose following the braiding pattern of FIG. 3.

Figure 8:
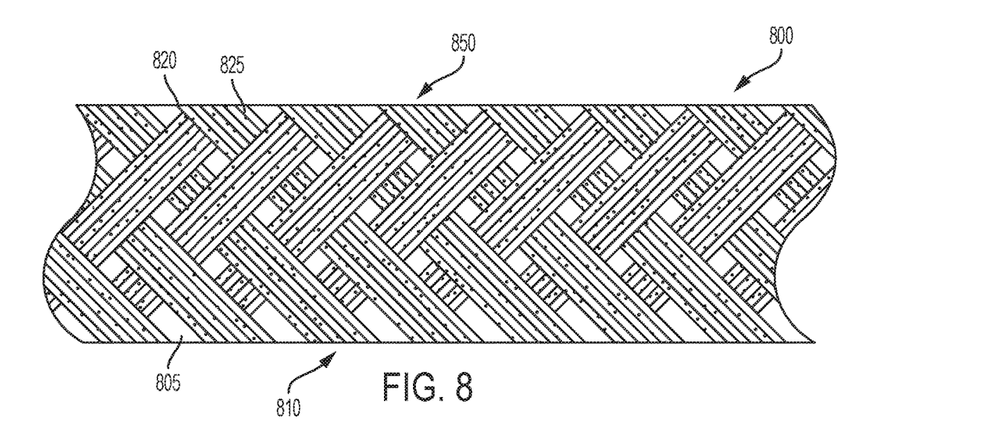
FIG. 8 illustrates a braiding pattern, according to an embodiment of the disclosure.

FIG. 8 illustrates a braiding pattern 800. FIG. 8 depicts an interior tube 805, a braided sleeve 810, a metallic thread 820, depicted with a patterned shading, a non-metallic thread 825, depicted without shading, and a mixed bundle 850. In some embodiments, mixed bundle 850 may include both metallic threads 820 and non-metallic threads 825. In some embodiments, a mixed bundle 850 may include three metallic threads 820 and three non-metallic threads 825. In this example, each mixed bundle 850 includes six threads—three metallic threads 820 and three non-metallic threads 825. In this example, metallic threads 820 and non-metallic threads 825 may be arranged to alternate in each mixed bundle 850. This braiding pattern may provide an even more uniform appearance.

It is to be understood that a bundle may have any number of threads. In some embodiments, a bundle may have 2 threads, or 3 threads, or 4 threads, or 5 threads, or 6 threads, or 7 threads, or 8 threads, or 9 threads, or 10 threads, or more than 10 threads. In some embodiments, a bundle may have any number of metallic threads. In some embodiments, a bundle may have a number of non-metallic threads equal to the number of metallic threads. In some embodiments, a bundle may have a number of non-metallic threads different to the number of metallic threads. According to some embodiments, metallic threads and non-metallic threads of a bundle may be arranged in any chosen order.

Figure 9:
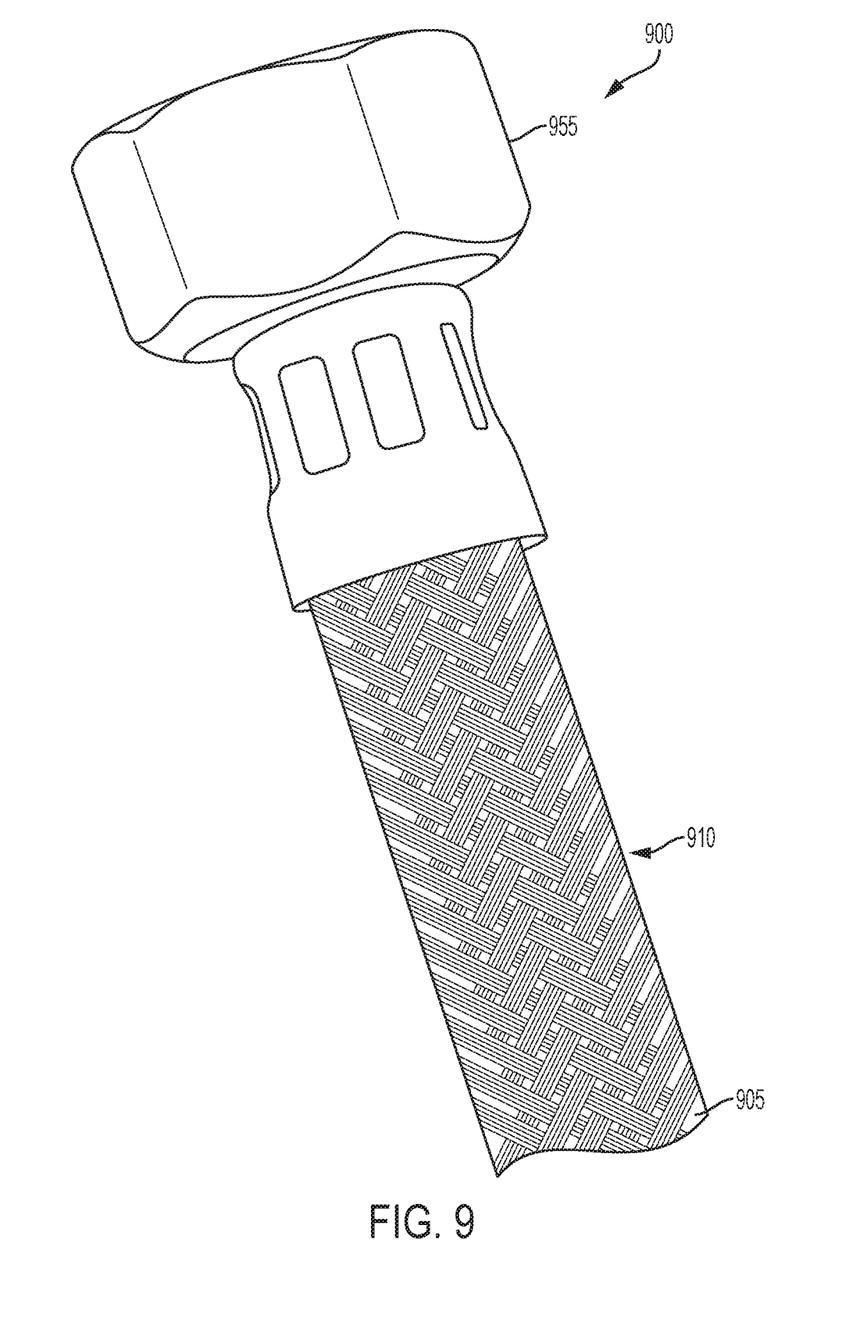
FIG. 9 illustrates a hose assembly, according to an embodiment of the disclosure.

FIG. 9 illustrates a hose assembly 900, comprising an interior tube 905, a braided sleeve 910, and a fitting 955. In some embodiments, fitting 955 may be coupled to an end of interior tube 905 and braided sleeve 910. In some embodiments, fitting 955 may be used to couple the braided hose to a plumbing fixture, a supply line, and/or the like.

Figure 10:
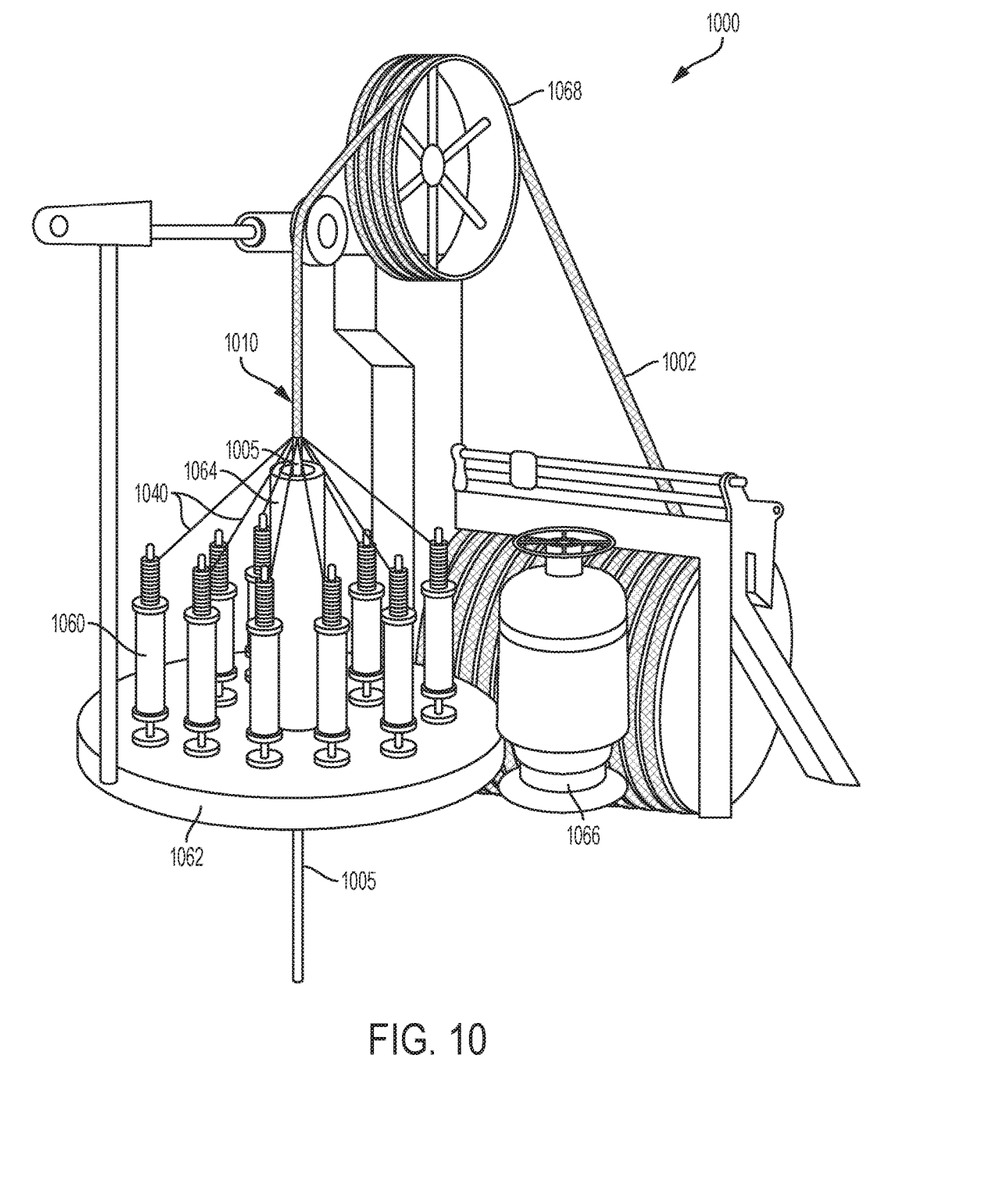
FIG. 10 illustrates an assembly for manufacturing a braided hose, according to a an embodiment of the disclosure.

FIG. 10 illustrates an assembly 1000 for manufacturing a braided hose 1002. Assembly 1000 may include a series of bobbins 1060 disposed on a platform 1062. Bobbins 1060 may store bundles 1040 of thread, the threads in bundles 1040 may be prearranged according to a chosen braiding pattern. Further, bobbins 1060 may be operable to rotate about their own axis and around platform 1062. Assembly 1000 may further comprise a guide 1064 mounted over an aperture in platform 1062. An interior tube 1005 may be directed through an aperture in platform 1062 and guide 1064. Assembly 1000 may comprise a motor 1066. Motor 1066 may be mechanically connected to platform 1062. Motor 1066 may be mechanically connected to a pulley 1068.

In some embodiments, a braided sleeve 1010 may be formed around an interior tube 1005 by interweaving bundle 1040 of thread from each bobbin 1060 about an outside surface of interior tube 1005. In some embodiments, a braided sleeve 1010 around an interior tube 1005 may be formed by rotating bobbins 1060 around platform 1062. According to some embodiments, bobbins 1060 may be rotated around a platform 1062 via motor 1066. In some embodiments, a braided sleeve 1010 may be formed by circulation of bobbins 1060 around interior tube 1005.

Of course, it will be appreciated that other braiding processes may be used. For example, a platform may remain stationary and the bobbins may rotate in groups about respective vertical axes. A group of bobbins may include 2 bobbins, 3 bobbins, 4 bobbins, 5 bobbins, 6 bobbins, and/or the like. Rotational paths of the groups of bobbins may overlap with adjacent groups so as to interweave bundles of thread. In an example, a braiding machine may have 24 bobbins. In some embodiments, a braiding machine with 24 bobbins may create a braided sleeve that includes 24 bundles.

Figure 11:
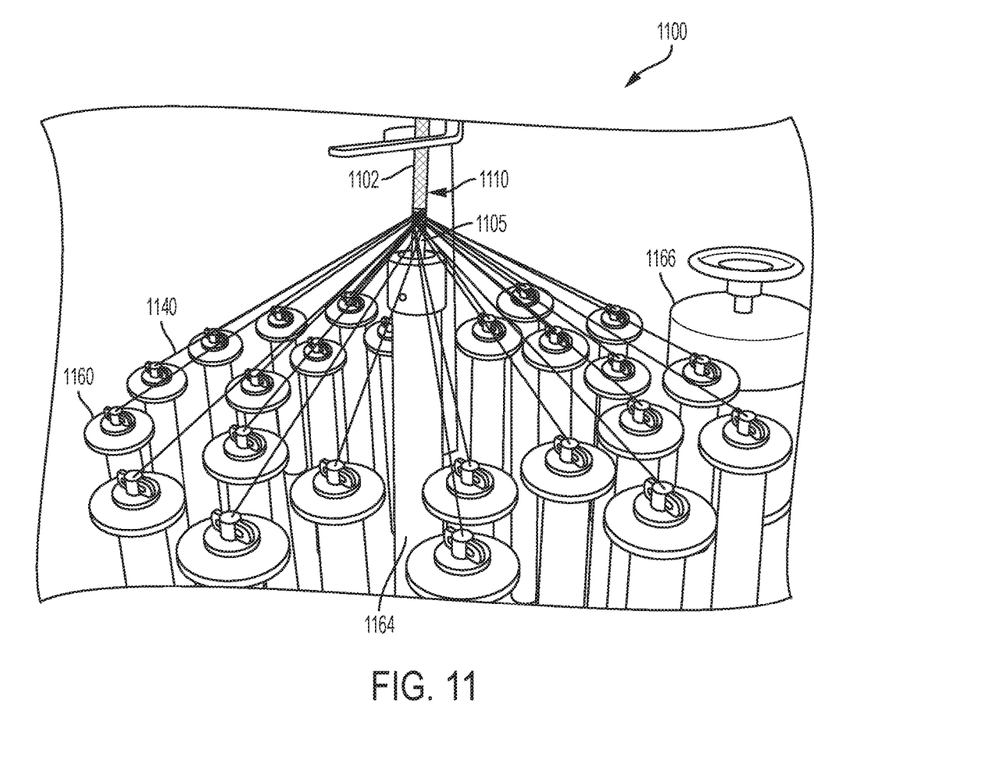
FIG. 11 illustrates a braiding machine, according to an embodiment of the disclosure.

FIG. 11 illustrates another braiding machine 1100. In some embodiments, a bobbin 1160 may store all threads corresponding to one bundle 1140. In some embodiments, each of the bobbins 1160 may store threads of one bundle 1140. For example, a braiding pattern may require a bundle 1140 to have six threads. Thus, bobbin 1160 may be prepared with six parallel threads. According to some embodiments, spools of material may be coupled to bobbin 1160 in a spooling machine. In some embodiments, a bobbin 1160 may be coupled to two spools, or three spools, or four spools, or five spools, or six spools, or seven spools, or eight spools, or more than eight spools. In some embodiments, all spools coupled to bobbin 1160 may have the same type of thread. In some embodiments, bobbin 1160 may have at least one spool of a metallic thread and at least one spool of a non-metallic thread.

For example, to create the braiding pattern of FIG. 3, half of bobbins 1160 have six spools of metallic thread, and the other half of bobbins 1160 have six spools of non-metallic thread.

In another example, bobbins 1160 may have three spools of metallic thread and three spools of non-metallic thread. Arranging the spools accordingly, the braiding patterns of FIGS. 5 and 8 may be created.

The breadth and scope of the invention(s) should not be limited by any of the above-described exemplary embodiments, but should be defined only in accordance with the following claims and their equivalents. Moreover, the above advantages and features are provided in described embodiments, but shall not limit the application of the claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in the claims found herein. Furthermore, any reference in this disclosure to "invention" in the singular should not be used to argue that there is only a single point of novelty claimed in this disclosure. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification, but should not be constrained by the headings set forth herein.

The invention claimed is:

1. A reinforced hose, comprising:
a tube; and
a braided sleeve disposed about an outside of the tube, wherein
the braided sleeve includes a plurality of bundles, a bundle being defined as a plurality of threads extending along a same path of a braiding pattern of the braided sleeve, and
at least one of the bundles includes a first thread of a first material and a second thread of a second material different than the first material.

2. The reinforced hose of claim 1, wherein the first material is metallic.

3. The reinforced hose of claim 2, wherein the first material includes stainless steel.

4. The reinforced hose of claim 2, wherein at least one of the first and second materials includes aluminum.

5. The reinforced hose of claim 1, wherein the second material is non-metallic.

6. The reinforced hose of claim 5, wherein the second material includes a polymer.

7. The reinforced hose of claim 5, wherein the second thread includes a monofilament selected from the group consisting of a polyester monofilament, a nylon monofilament, and any combination thereof.

8. The reinforced hose of claim 1, wherein the first thread is metallic and the second thread is non-metallic.

9. The reinforced hose of claim 1, further comprising a fitting coupled to an end of the tube and the braided sleeve.

10. The reinforced hose of claim 1, wherein
at least one of the bundles includes a plurality of metallic threads and a plurality of non-metallic threads, and
the metallic threads are arranged to alternate with the non-metallic threads.

11. The reinforced hose of claim 1, wherein the first thread and the second thread are a similar color.

12. A reinforced hose, comprising:
a tube; and
a braided sleeve disposed about an outside of the tube, wherein
the braided sleeve includes a plurality of bundles, a bundle being defined as a plurality of threads extending along a same path of a braiding pattern of the braided sleeve,
at least one of the bundles is a mixed bundle, a mixed bundle being defined as a bundle of threads including at least one thread of a first material and at least one thread of a second material different than the first material, and
a burst pressure of the reinforced hose is higher than a burst pressure of a hose without the at least one mixed bundle.

13. The reinforced hose of claim 12, wherein the first material is metallic.

14. The reinforced hose of claim 13, wherein the first material includes stainless steel.

15. The reinforced hose of claim 13, wherein the first material includes aluminum.

16. The reinforced hose of claim 12, wherein the second material is non-metallic.

17. The reinforced hose of claim 16, wherein the second material includes a polymer.

18. The reinforced hose of claim 16, wherein the second material includes a monofilament selected from the group consisting of a polyester monofilament, a nylon monofilament, and any combination thereof.

19. The reinforced hose of claim 12, wherein the first material is metallic and the second material is non-metallic.

20. The reinforced hose of claim 12, wherein the burst pressure of the reinforced hose is at least about 10% higher than the burst pressure of the hose without the at least one mixed bundle.

21. The reinforced hose of claim 12, wherein the burst pressure has a value of at least 1150 psi.

22. The reinforced hose of claim 1, wherein the braided sleeve is disposed at an exterior surface of the reinforced hose.

* * * * *